Patented Jan. 19, 1932

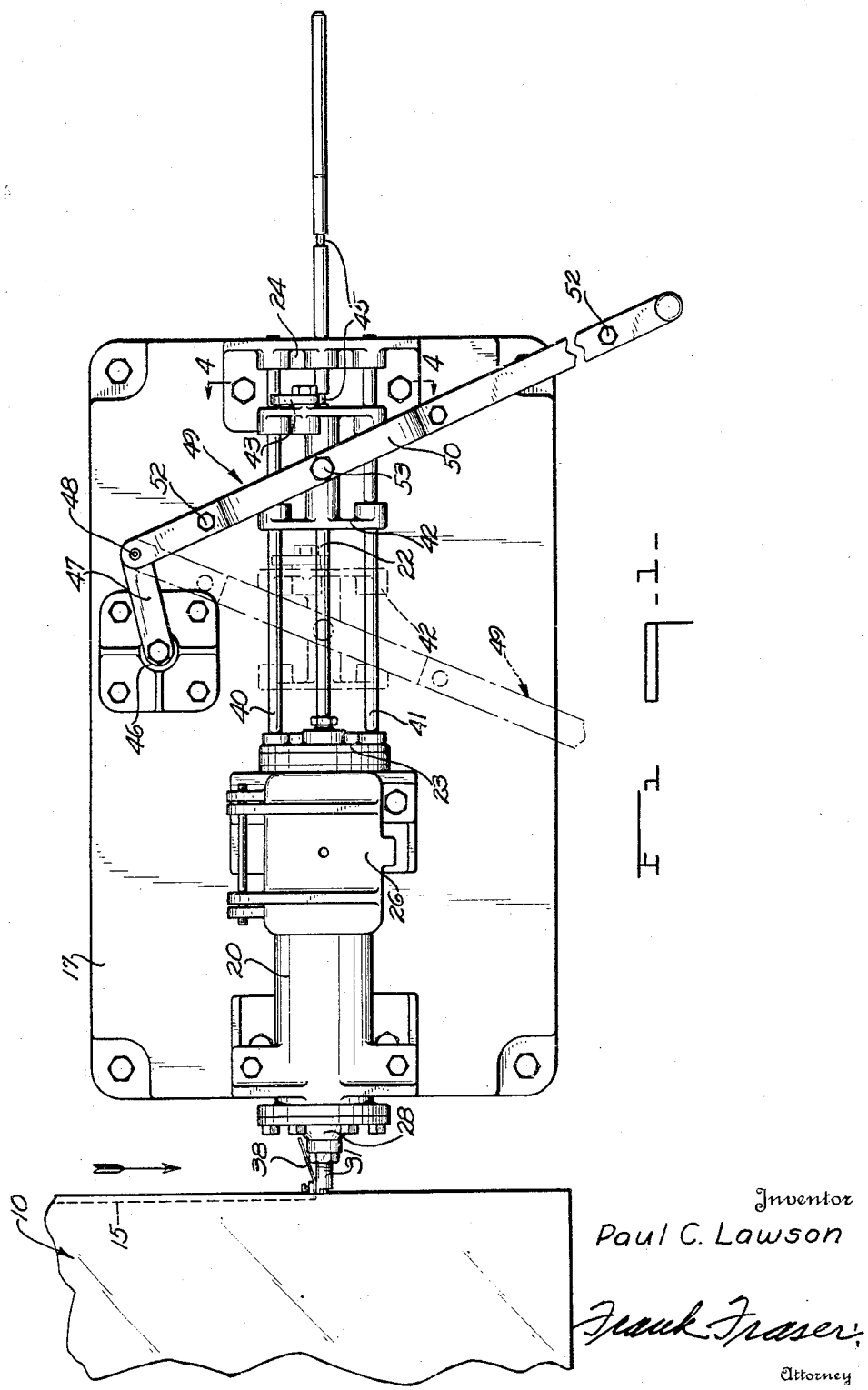

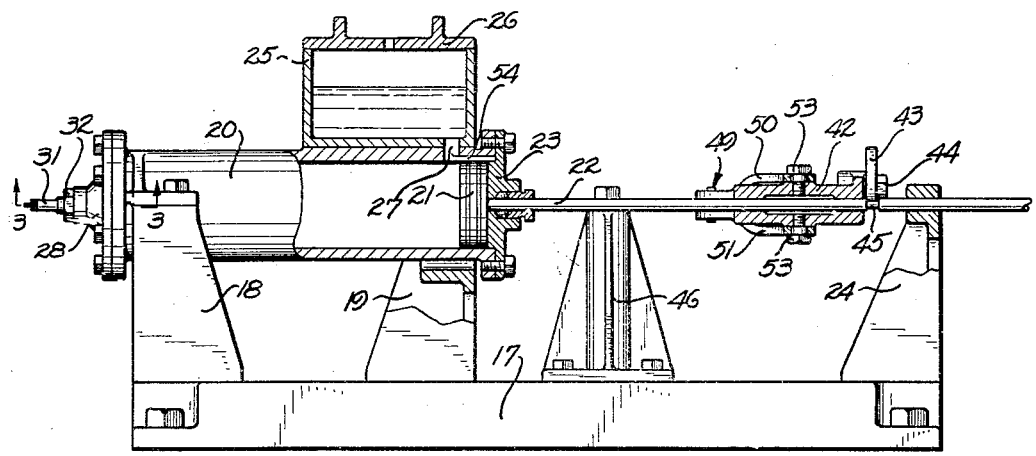
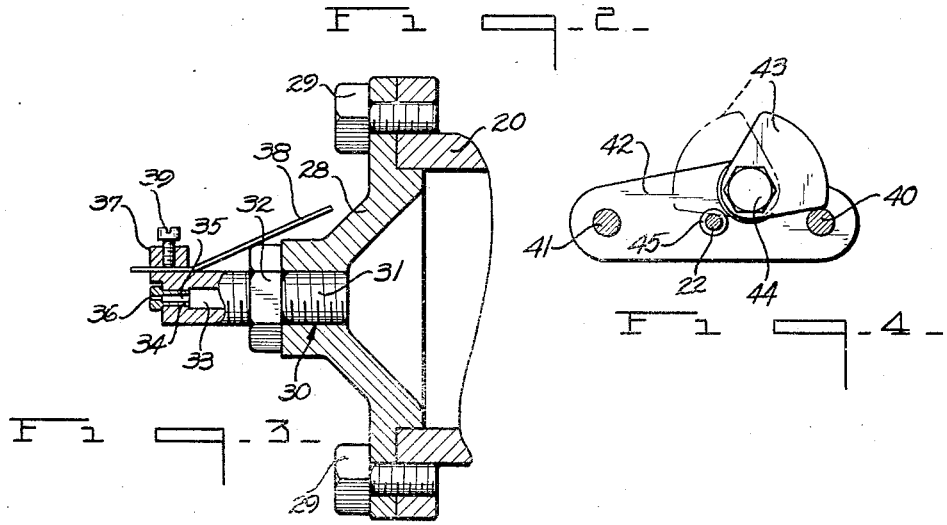
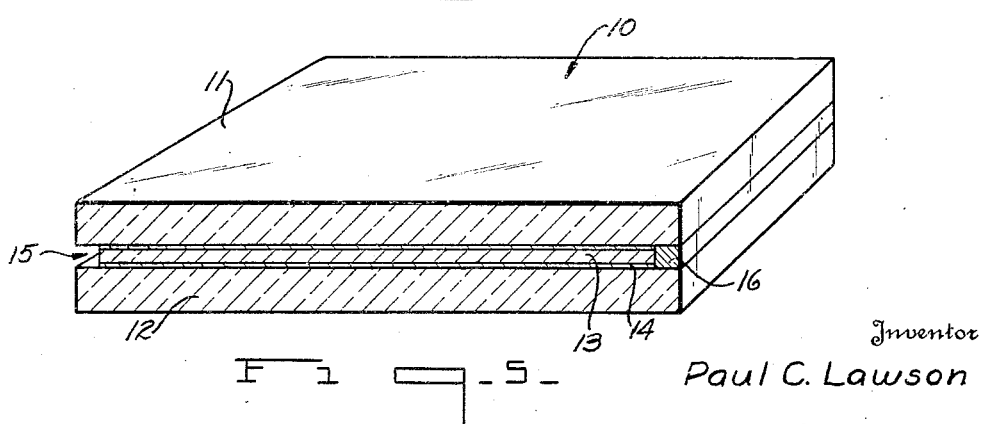

1,841,745

UNITED STATES PATENT OFFICE

PAUL C. LAWSON, OF TOLEDO, OHIO, ASSIGNOR TO LIBBEY-OWENS-FORD GLASS COMPANY, OF TOLEDO, OHIO, A CORPORATION OF OHIO

APPARATUS FOR SEALING LAMINATED GLASS

Application filed May 5, 1928. Serial No. 275,302.

The present invention relates to an improved type of apparatus for use in the manufacture of composite or laminated glass.

This invention is primarily designed for and finds its greatest utility when employed for sealing the edges of laminated sheets of glass in a manner to form a seal in said edges which will protect the bond between the laminations from the atmosphere.

An important object of the invention is to provide an improved sealing machine or apparatus of a novel and practical construction by the use of which the seal can be placed in position in the edges of the laminated sheets of glass in a rapid, convenient and efficient manner.

Another object of the invention is the provision of an improved sealing machine or apparatus whereby the sealing material is adapted to be forced into place in the edges of the laminated sheets of glass under pressure.

Other objects and advantages of the invention will become more apparent during the course of the following description when taken in connection with the accompanying drawings.

In the drawings forming a part of this application and wherein like numerals are employed to designate like parts throughout the same, Fig. 1 is a top plan view of a sealing machine constructed in accordance with the present invention showing it in operative relation to a laminated sheet of glass to be sealed.

Fig. 2 is a side elevation thereof partially in section.

Fig. 3 is a detail section taken substantially on line 3—3 of Fig. 2.

Fig. 4 is a transverse section taken substantially on line 4—4 of Fig. 1, and

Fig. 5 is a perspective sectional view of a sheet of laminated glass showing one edge thereof prior to sealing and the opposite edge after the sealing operation.

Referring now to the drawings, with particular reference first to Fig. 5, there is illustrated therein a sheet of laminated glass designated in its entirety by the numeral 10 and being composed of the two sheets of preferably transparent glass 11 and 12 having interposed therebetween a sheet, layer or membrane of non-brittle material 13 bonded or united to the glass sheets by any suitable solvent, adhesive or the like 14 to provide a composite or unitary structure. In the manufacture of laminated glass, a continuous channel or groove 15 is sometimes initially formed around the edges of the laminated sheet and this channel or groove is then adapted to be subsequently filled with a suitable seal or the like 16, said seal being provided to protect the bond 14 between the laminations and the sheet of non-brittle material 13 from the atmosphere which ordinarily proves detrimental thereto causing a breaking down of the bond and the formation of socalled "let-goes".

The present invention consists essentially in the provision of an improved type of apparatus or machine by the use of which the seal 16 may be placed within the channel or groove 15 in an easy and convenient manner. This machine as herein disclosed preferably comprises a bed plate 17 upon which are secured a pair of spaced upright supports 18 and 19 carrying the horizontally arranged cylinder 20 within which is disposed a piston 21 operable by means of the piston rod 22, said piston rod passing rearwardly through the back plate 23 of the cylinder 20 and being slidably received through the upper end of the standard or support 24. Mounted upon the cylinder 20 is a box or container 25 within which is adapted to be placed the sealing material to be used. The container 25 is preferably provided with a hinged cover or top 26 and communicates with the cylinder 20, adjacent the rear end thereof, through a vertical passage 27.

The forward end of the cylinder 20 is provided with a cylinder head 28 bolted or otherwise suitably secured thereto as at 29. The cylinder head is preferably of substantially conical formation and is provided with an outlet 30 within which is threaded a nipple 31 secured in place by a lock nut 32. The nipple 30 is provided with a bore 33 extending entirely therethrough and fitted within the outer end of this bore is an outlet tip or nozzle 34, said nozzle having an opening 35 communicating with the bore of said nipple and being of a reduced diameter at its outer end as at 36. The nipple 31 is preferably provided adjacent its outer end with a lateral enlargement or lug 37 having a slot or opening through which is adapted to be inserted a guide wire or the like 38 held in place by a set screw 39.

Briefly stated, the operation of the apparatus just described is as follows: The sealing material is adapted to be initially placed within the container 25 and the piston 21 is withdrawn to the extreme rear end of the cylinder 20 as shown in Fig. 2 so that the sealing material is allowed to flow from the container 25 through the passage 27 into the cylinder 20 in advance of piston 21. The laminated sheet of glass 10 to be sealed is then placed in a horizontal position as shown in Fig. 1 and moved in a definite horizontal path in the direction indicated by the arrow. The guide wire 38 projects slightly beyond the outlet nozzle and is adapted to be received within the channel or groove 15 being sealed, this guide wire being adapted to maintain the laminated sheet in proper relation to the outlet nozzle during the sealing operation. As the laminated sheet is moved along, the piston 21 is gradually moved forwardly within the cylinder 20 to force or eject the sealing material within the cylinder outwardly thereof through the nipple 31 and outlet nozzle 34 into the channel or groove to be sealed under pressure. This sealing material is adapted to completely fill up the channel or groove and to provide an effective seal as indicated at 16 in Fig. 5 for protecting the bond between the laminations and the interposed sheet of non-brittle material.

Any suitable means may be provided for operating the piston 21 to force the sealing material from the cylinder 20 into place in the edge of the laminated sheet. However, the construction herein shown for accomplishing this purpose comprises the spaced horizontal guide rods 40 and 41 extending between and secured to the back plate 23 of cylinder 20 and standard 24, said rods being arranged at opposite sides of and preferably parallel with the piston rod 22. Slidably mounted upon the guide rods 40 and 41 and also upon the piston rod 22 is a frame or carriage 42 carrying a plate or flapper 43 pivoted thereto at 44.

The piston rod 22 is provided at spaced points throughout its length with circumferential grooves or channels 45 and when the plate or flapper 43 is in operative position it is adapted to be received within one of said grooves as shown in Fig. 2 and indicated by the broken lines in Fig. 4. When in inoperative position, however, the plate or flapper 43 is adapted to be swung about its pivot to the position indicated by the full lines in Fig. 4 whereupon it will rest upon the guide rod 40. Rising from the bed plate 17 is a standard 46 to the upper end of which is pivoted a link 47 having pivoted to the outer end thereof as at 48 the operating lever designated in its entirety by the numeral 49 and comprising the upper and lower straps 50 and 51 secured together by bolts or the like 52. The straps 50 and 51 are adapted to pass respectively above and beneath the frame 42 as shown most clearly in Fig. 2 and to be pivotally connected to said frame by suitable means 53.

When it is desired to operate the piston 21 so as to move the same forwardly within cylinder 20, the operator grasps the lever 49 and swings the same rearwardly so as to slide the frame 42 rearwardly upon the guide rods to a position adjacent the standard 24 as indicated by the full lines in Fig. 1. When the frame is in proper position, the plate or flapper 43 is swung about its pivot into engagement with one of the grooves 45 in piston rod 22. The operating lever is then swung forwardly so as to slide the frame 42 along the guide rods 40 and 41 and since the flapper plate 43 is engaged within one of the grooves 45, it will be apparent that the piston rod 22 will also be moved forwardly and likewise the piston 21 will be urged forwardly within cylinder 20.

The frame 42 and piston rod 22 are moved forwardly until the said frame assumes substantially the position indicated by the broken lines in Fig. 1 which might be said to be the completion of one forward stroke. Upon the completion of said stroke, the plate 43 is swung in the opposite direction about its pivot out of engagement with the piston rod 22 and the frame 42 then returned along the guide rods 40 and 41 to its initial starting position. The flapper plate is then again adapted to be swung about its pivot to engage the next succeeding groove 45 in piston rod 22 whereupon the above cycle of operations is repeated. A series of such forward strokes may be required before the piston is caused to travel the entire length of the cylinder. It will be apparent that during the forward stroke of the piston the sealing material will be forced from the cylinder into the groove or channel of the laminated sheet of glass to be sealed as said sheet is moved along in proximity to the outlet nozzle.

When the piston 21 reaches the forward end of the cylinder the same may be withdrawn rearwardly to its starting position by a series of retracting operations wherein the frame 42 and plate 43 are operated in a manner just the reverse of the manner in which they are operated for moving the piston forwardly within the cylinder. Otherwise stated, the plate 43 is moved to its inoperative position and the frame moved forwardly along the guide rods 40 and 41 to the broken line position shown in Fig. 1. The plate 43 is then moved to engage the piston rod 22 after which the frame is moved rearwardly causing a retraction of the piston rod and piston. This operation is repeated until the piston is at the extreme rear end of the cylinder whereupon another supply of sealing fluid is allowed to pass from the container 25 into the cylinder 20. During the rearward movement of the piston within the cylinder, any sealing material which might have found its way in back of the piston will be forced or caused to pass forwardly thereof through the by-pass opening or slot 54. While the sheet has been shown as being passed horizontally during the sealing operation, it will be apparent that the same may be moved vertically either up or down or at any desired angle by simply loosening the lock nut 32 and rotating the nipple 31 until the guide wire 38 is in the desired position.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a sealing machine for use in the sealing of laminated sheets of glass, a cylinder containing a supply of sealing material and having an outlet adjacent which the laminated sheet to be sealed is adapted to be moved, a piston working within the cylinder for forcing the sealing material therefrom into place under pressure, and means for operating the piston including a piston rod fixed at one end to said piston and projecting outwardly of the cylinder, a frame slidable along the piston rod, means for slidably supporting the frame, and means carried by the frame and adapted to engage the rod for moving the same to operate said piston.

2. In a sealing machine for use in the sealing of laminated sheets of glass, a cylinder containing a supply of sealing material and having an outlet adjacent which the laminated sheet to be sealed is adapted to be moved, a piston working within the cylinder for forcing the sealing material therefrom into place under pressure, and means for operating the piston including a piston rod fixed at one end to said piston and projecting outwardly of the cylinder, a frame slidable along the piston rod, means for slidably supporting the frame, a plate pivotally carried by said frame and movable into and out of engagement with the piston rod, and an operating lever connected with the frame.

3. In a sealing machine for use in the sealing of laminated sheets of glass, a cylinder containing a supply of sealing material and having an outlet adjacent which the laminated sheet to be sealed is adapted to be moved, a piston working within the cylinder for forcing the sealing material therefrom into place under pressure, and means for operating the piston including a piston rod fixed at one end to said piston and projecting outwardly of the cylinder, said piston rod being provided with a series of spaced recesses, a frame slidable along the piston rod, guide rods for slidably supporting the frame, a plate pivotally carried by said frame and adapted for selective engagement with the recesses in the piston rod, and an operating lever connected with the frame.

Signed at Toledo, in the county of Lucas and State of Ohio, this 1st day of May, 1928.

PAUL C. LAWSON.